United States Patent [19]

Schwarz et al.

[11] Patent Number: 5,372,640
[45] Date of Patent: Dec. 13, 1994

[54] TECTOALUMINOSILICATE CEMENT AND A PROCESS FOR ITS MANUFACTURE

[75] Inventors: Wolfgang Schwarz, Vienna, Austria; André Lerat, Mons,

[73] Assignee: Holderbank Financiere Glarus AG., Glarus, Switzerland

[21] Appl. No.: 855,014

[22] PCT Filed: Aug. 24, 1991

[86] PCT No.: PCT/EP91/01607
§ 371 Date: Jun. 9, 1992
§ 102(e) Date: Jun. 9, 1992

[87] PCT Pub. No.: WO92/04300
PCT Pub. Date: Mar. 19, 1992

[30] Foreign Application Priority Data

Sep. 3, 1990 [CH] Switzerland ............... CH2849/90

[51] Int. Cl.$^5$ .............................................. C04B 7/06
[52] U.S. Cl. ........................ 106/705; 106/709; 106/713
[58] Field of Search .......... 106/624, 705, 709, 713, 106/714, 315; C04B 7/06

[56] References Cited

U.S. PATENT DOCUMENTS

| 4,153,655 | 5/1979 | Minnick et al. | 264/8 |
| 4,640,715 | 2/1987 | Heitzmann et al. | 106/85 |
| 4,642,137 | 2/1987 | Heitzmann et al. | 106/85 |

FOREIGN PATENT DOCUMENTS

3800776A1 7/1989 Germany.

OTHER PUBLICATIONS

Chemical Abstract –"Study of hydration of glass like analogs of the Calcium Oxide–Aluminum Oxide–Silicon Dioxide System in the Presence of Alkali Metal Compounds" Krivenko et al. (USSR) (Sep. 1989) Zh. Prikl. Khim. (Leningrad) 62(4) pp. 796-804.

*Primary Examiner*—Mark L. Bell
*Assistant Examiner*—Paul Marcantoni
*Attorney, Agent, or Firm*—Brady, O'Boyle & Gates

[57] ABSTRACT

A tectoaluminosilicate cement which consists of K, Ca and aluminosilicates plus, optionally, Li, Na and Mg, contains: a phyllosilicate dehydroxylated at a temperature between 500° and 900° C., reactive amorphous silica, reactive calcium silicate glass or reactive calcium aluminosilicate glass with a Ca:Si ratio of $\geq 1$ and alkali silicate with the total formula: $a(M_2O) * x(SiO_2) * y(H_2O)$ in which M=Li, Na or K, a=0–4, x=0–5 and y=3–20, the overall Si:Al ratio being $\geq 1$. The tectoaluminosilicate cement preferably alkali hydroxide. The dehydroxylated phyllosilicate is a metakaolin giving tectosilicate structures. The reactive amorphous silica is a dealuminated phyllosilicate, a fly ash dealuminated with mineral acids, where applicable, a fine-grained crystalline form of $SiO_2$ contained in calcinated clays, a silicic acid gel, thermally activated by alkali-activated aluminosilicate, obtained by sintering an aluminosilicate with alkali carbonate at a temperture between 800° and 1,200° C., the alkali and aluminosilicate components being mixed in the ratio 1:6 to 1:1, and/or microsilica ("silica fume"). The alkali metal activator may be prepared in situ from the dealuminated phyllosilicate and/or from the silicic acid gel in the presence of the alkali hydroxide. A bonding matrix obtained from the tectoaluminosilicate cement by reacting with water in the ratio 3:1 to 6:1 consists essentially of the formula: $(Li, Na)_{0-7}K_{1-6}Mg_{1-0}Ca_{3-0}[Al_4Si_{6-14}O_{21-36}]\cdot(0-15H_2O)$.

18 Claims, 6 Drawing Sheets

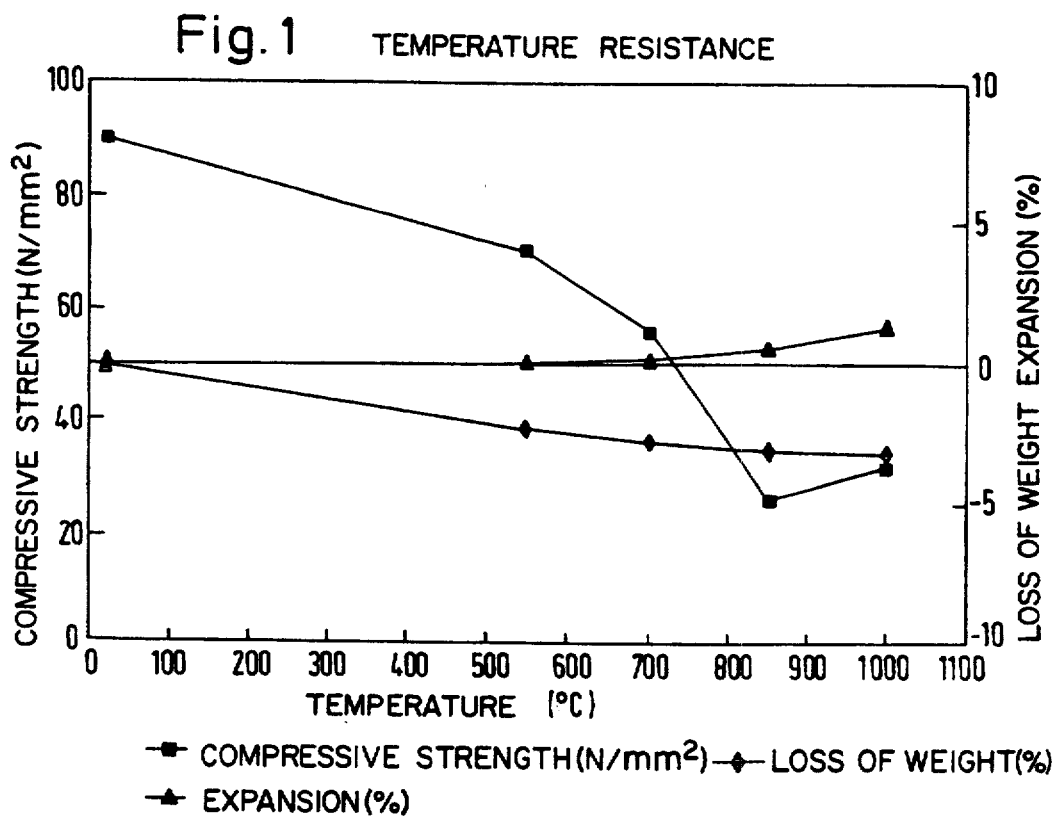
Fig. 1 TEMPERATURE RESISTANCE
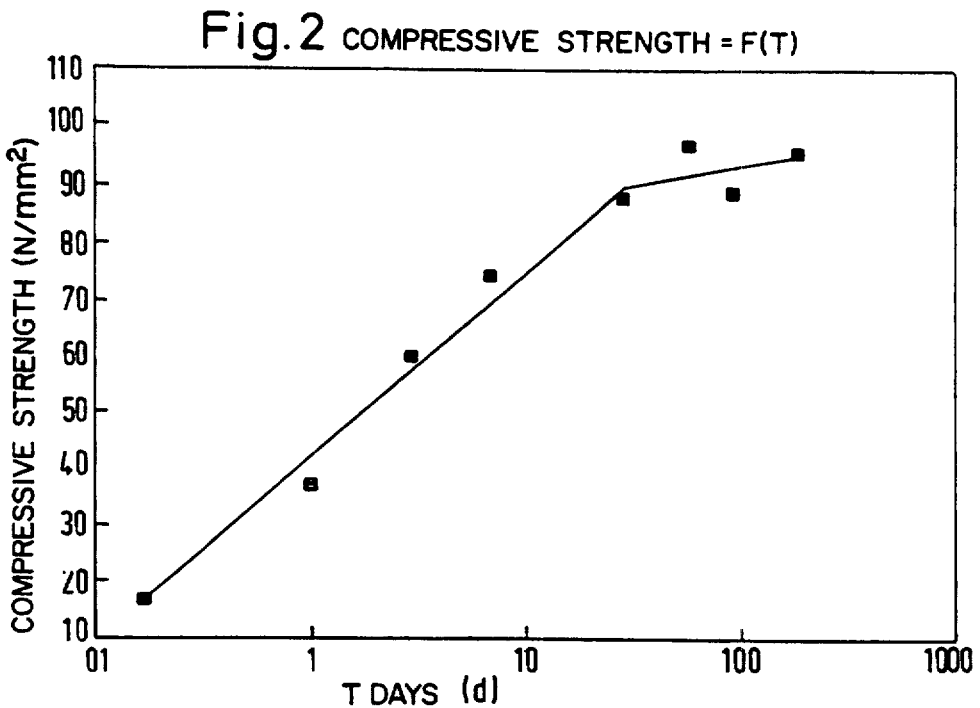
Fig. 2 COMPRESSIVE STRENGTH = F(T)

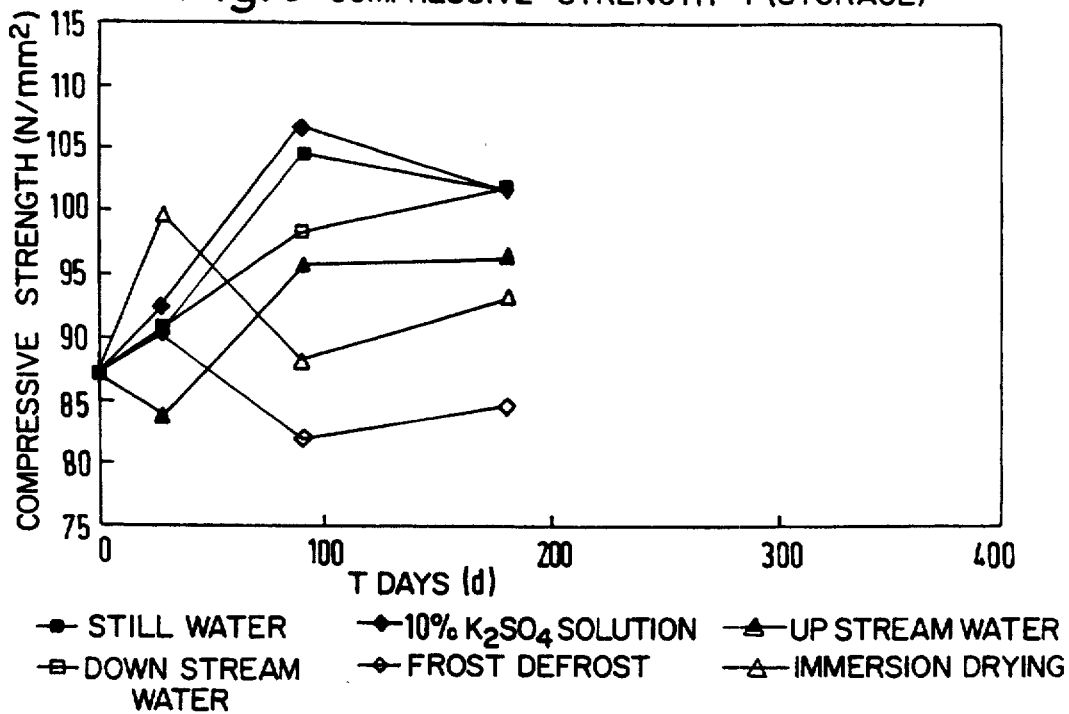
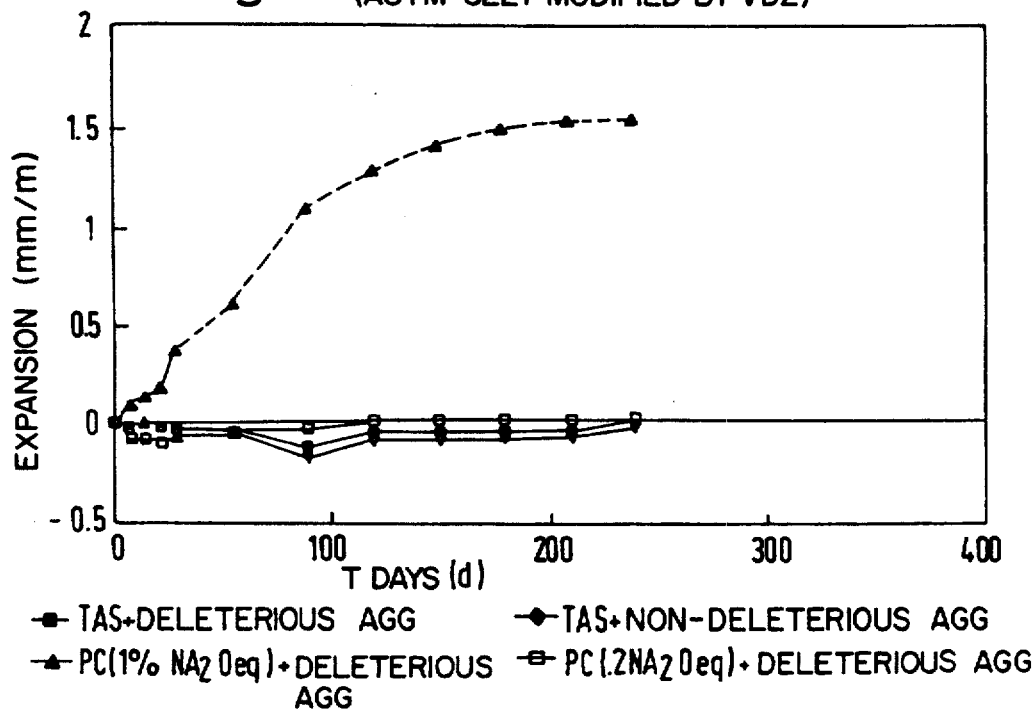

TAS-MATRIX

P50-SET CEMENT

TAS-MATRIX

P 50-SET CEMENT

TECTOALUMINOSILICATE CEMENT AND A PROCESS FOR ITS MANUFACTURE

The invention relates to a tectoaluminosilicate cement containing K, Ca and alumosilicate together, where applicable, with Li, Na and Mg, a bonding matrix obtained from the tectoaluminosilicate cement, through a reaction with $H_2O$ in a ratio of from 3:1 to 6:1, a concrete with a bonding matrix, standard aggregates in a ratio of from 1:2 to 1:3 and a bonding agent/water ratio of from 5:1 to 3.3:1, and a process for the manufacture of a thermically alkali-activated alumino-silicate as a reactive silica for the manufacture of the tectoaluminosilicate cement.

Hydraulically solidifying inorganic bonding agents based on calcium and aluminium silicate have been known since ancient times. More recently, various bonding agents, both standard and specialized, have been developed (of main classification CO4 of the International Patent Classification).

The tectoaluminosilicate cement of the invention is distinguished from bonding agents existing in current technology by its composition as well as by the characteristics of the bonding matrix and of the concrete so produced.

From the tectoaluminosilicate cement of the invention, a bonding matrix is obtained. The preferred embodiment is a bonding matrix.

A concrete made in accordance with the invention, using the bonding matrix of the invention, is defined in and a preferred embodiment.

A process in accordance with the invention for the manufacture of a thermically alkali-activated alumino-silicate as a reactive silica for the manufacture of the tectoaluminosilicate cement.

The bonding matrix based on tectoaluminosilicate cement in accordance with the invention may be used as an inorganic hydraulic bonding agent setting quickly to a high degree of hardness. Compared with traditional hydraulically hardening bonding agents such as Portland and alumina cements, it is distinguished by a combination of higher mechanical, chemical and mineralogical strength usually attained only by special cements.

The characteristics of the bonding matrix of the invention result from the dense structure of cryptocrystalline xenomorphic microcrystals in a perlite matrix and from their chemical-physical composition. The dense perlite structure leads to minimal porosity and permeability as well as to an optimal mechanical load capacity.

Unlike traditional hydraulic bonding matrixes, the pores which do exist are closed (i.e. the pores are not interconnected) and are statistically distributed. The microcrystals (the mineral components) have similar physical and chemical characteristics to each other. For this reason, there is no appearance of preferential cracking zones under mechanical load. However, the arrangement of the microcrystals produces a flexibility comparable to that of traditional hydraulic cements.

In contrast to a bonding matrix based on tectoaluminosilicate cement in accordance with the invention, the hardening mechanism of traditional hydraulic cements mainly requires hydration, i.e. an excess of water remains in the bonding matrix, which determines its inherent porosity and permeability.

With traditional hydraulic bonding agents, which harden at ambient temperature ($-5°$ C. to $+30°$ C.), the bonding matrix also consists of interwoven microcrystals which, as in the case of Portland cement, differ greatly in their chemical composition, crystal structure and chemical-physical characteristics or which, as in the case of alumina cement, have metastable crystal phases.

The tectoaluminosilicate cement-based bonding matrix of the invention consists of tectosilicate microcrystals which have very similar chemical-physical characteristics to traditional hydraulic bonding agents but which are clearly different in their crystal structure, properties and formation.

The tectoaluminosilicate cement-based bonding matrix of the invention combines the high mechanical load capacity, impermeability and corrosion resistance of ceramic materials with the flexibility and the quick-setting at ambient temperature of hydraulic special cements.

The tectoaluminosilicate cement-based bonding matrix of the invention displays extraordinarily high temperature resistance and mechanical load capacity. In combination with inert aggregates, such as sand and gravel, the result is a building material of unusually high strength at both early and final stages.

A standard mortar made from the bonding matrix of the invention (weight ratio of cement/ISO sand=1/3, weight ratio of water/cement=0.20 to 0.30) sets after 15-30 min and reaches a compressive strength of 7 MPa after 4 hours, at least 35 MPa after 24 hours and at least 60 MPa after 28 days at $20°$ C.

Mortars and concretes produced from the tectoaluminosilicate cement-based bonding matrix of the invention are strong, resistant to freezing and thawing and to corrosion. They provide constructional steel with better corrosion resistance than mortars and cements made from Portland or alumina cements.

In contrast to traditional inorganic bonding agents, the bonding matrix of the invention displays very low porosity. It is resistant and practically impenetrable to water and organic solvents such as acetone, alcohol, etc. It is resistant to dilute solutions of acids, alkalis, salts, etc. Chemical resistance can be adapted to requirements through the Si/Al weight ratio.

The first component of the tectoaluminosilicate cement of the invention, dehydroxilated phyllosilicate is preferably obtained by calcination of phyllosilicates within a temperature range of $500°$ C. to $900°$ C. Through calcination, the phyllosilicates lose not only the water related to their internal structure but also the OH groups in the silanol (—Si—OH) and —AL—OH groups. Thus, the phyllosilicate is dehydroxilated with a modification of the crystal structure. Such thermically activated sheet (phyllo-) silicates, in general metakaolin, have been used since classical times (e.g. Roman cement) in combination with Portland cement for the manufacture of hydraulic bonding agents. There, however, in contrast to the process in the invention, the metakaolin is used as a pozzolan component analagous to the so-called pozzolan cements. In the pozzolan reaction, as a result of reaction with calcium hydroxide released during the hydration of Portland cement silicate minerals, hydrated calcium chain and strip silicates are formed and no tectosilicates- or only small quantities in the presence of alkali components.

For the second reactive component of the tectoaluminosilicate cement of the invention, reactive silica, use can preferably be made of dealuminated phyllosilicate, dealuminated fly ash, thermically alkali-activated aluminosilicate, where applicable, the fine-grained crystalline form of $SiO_2$ contained in calcinated clays or microsilica. Microsilica means amorphous silicic acids ($SiO_2 > 94\%$) with a grain size from 0.1 to 2.0 μm, such as may occur, for example, in steel manufacture.

Dealuminated phyllosilicates result from the treatment of phyllosilicates with hydrochloric or sulphuric acids. The acid treatment dissolves the $Al(OH)_3$ layers as aluminium salt. The residue, which is indissoluble in the acids, is a highly porous, superficially fully hydrated, very reactive silicic acid. An example that can be adduced is the "gulsenite" produced from the boiling of serpentine with concentrated sulphuric acid by MAGINDAG, Veitscher Magnesitwerke AG, Austria. This is a by-product of the manufacture of magnesium chloride and caustic magnesia.

A reactive silicic acid gel can also be produced by dealuminating coal power station fly ash with mineral acids.

More highly reactive silicic acids arise from the treatment of clay with mineral acids (Mizusawa Industrial Chemicals Ltd, Japan). The resulting silicic acid gel has a particle diameter of from 0.1 to 1.0 μm and, unlike microsilica, is very easily dispersed in alkaline aqueous solutions.

In the invention, thermically alkali-activated aluminosilicate can be produced by sintering sodium, potassium and/or lithium carbonate with an aluminium silicate (e.g. coal power station fly ash) in a temperature range of from 800° C. to 1200° C. Instead of alkali carbonate, it is also possible to use alkali hydroxide and alkali salts, which form alkali oxide in the sintering temperature range. Borax or phosphate can be used as a flux. Alkali and aluminium silicate components are mixed together in a ratio of from 1:6 to 1:1 (e.g. by grinding or placing in a homogenizer) and heated at least until sintering is complete or, where applicable, to melting point. The smelt and/or sinter product is cooled (quenched) as quickly as possible and ground.

The thermically alkali-activated aluminosilicate contains reactive soluble silicate and sodium (potassium) aluminosilicate glass together with crystalline sodium (potassium) aluminosilicate (e.g. Carnegieite Na[AlSiO4] and/or potassium phyllite K[AlSiO4]. This acts both as a reactive silica component and as a reactive aluminosilicate glass.

Of the three reactive silicas, microsilica is the least reactive. Also known as "silica fume", it is available in large quantities as a by-product of steel production and is a common aggregate for Portland cement. Compared to thermically alkali-activated aluminosilicates and dealuminated phyllosilicates, microsilica has the disadvantage that, due to its low reactivity, it remains to a considerable extent in the form of spherical agglomerates within the bonding matrix. With higher batching quantities of microsilica, these agglomerates lead to a rapid reduction in mechanical strength. For this reason, very tight limits are set for microsilica batching. This is a serious disadvantage for the use of microsilica, given that, among other things, the chemical resistance of the tectosilicate bonding matrix is largely determined by the Si/Al ratio. The low reactivity of microsilica can be used for long-term reactive bonding matrixes with self-curing properties. An advantage of microsilica is its availability in large quantities.

The three materials referred to above can be used as "reactive silica" components whether individually or in combination.

The third reactive component is a reactive calcium aluminosilicate glass, which preferably satisfies the following conditions: (i) molar ratio of $Ca/Si \geq 1$ (ii) in contact with an alkaline solution having a pH value $\geq 13$, calcium hydroxide and alkali-calcium-tectosilicates are formed. The following materials, for example, fulfil the above requirements: blast furnace slag, steel slag, combustion chamber fly ash, where the aluminosilicate glass components are partly replaceable by the thermically alkali-activated aluminosilicate.

In an alkaline environment, basic calcium silicate compounds also give off $Ca^{2+}$ as calcium hydroxide and can thus serve as a slow release source for $Ca^{2+}$. The rate at which $Ca^{2+}$ is given off increases in the sequence calcium aluminosilicate glass < calcium silicate glass < belite < alite. In the invention, where basic calcium silicate compounds are used, thermically alkali-activated aluminosilicate is added as the aluminosilicate glass component.

Due to the high reactivity of belite and alite, precisely controlled conditions are needed to prevent the formation of chain and strip silicates instead of tectosilicates.

The fourth component used is preferably an alkali silicate with the molecular formula (I)

$$a(M_2O) * x(SiO_2) * y(H_2O) \qquad (I)$$

with M=Li, Na, K and a=0-4, x=0-5 and y=3-20 acting as a water-soluble alkali activator. Good results are obtained with dipotassium-trisilicate ($K_2O * 3SiO_2 * xH_2O$) and KOH in a weight ratio of from 2:1 to 4:1. However, it is also possible to use mixed alkali-silicates and/or alkali-silicates in an aqueous solution of the type sodium water glass and/or potassium water glass.

Five examples are given below of basic formulations for tectoaluminosilicate cement.

Formulation 1

100 parts/weight dehydroxilated phyllosilicate (e.g. Metakaolin)
30-50 parts/weight potassium trisilicate
50-75 parts/weight amorphous silica
50-80 parts/weight basic calcium silicate/calcium aluminosilicate glass
5-25 parts/weight potassium hydroxide Formulation 2

100 parts/weight dehydroxilated phyllosilicate (e.g. Metakaolin)
10-30 parts/weight potassium trisilicate
50-75 parts/weight delaluminated phyllosilicate
50-80 parts/weight basic calcium silicate/calcium alumosilicate glass
5-25 parts/weight potassium hydroxide Formulation 3

100 parts/weight dehydroxilated phyllosilicate (e.g. Metakaolin)
15-50 parts/weight potassium trisilicate
100-400 parts/weight thermically alkali-activated aluminosilicate
10-40 parts/weight amorphous silica
30-80 parts/weight basic calcium silicate/calcium aluminosilicate glass
5-35 parts/weight potassium hydroxide Formulation 4

100 parts/weight dehydroxilated phyllosilicate (e.g. Metakaolin)
15–50 parts/weight potassium trisilicate
100–400 parts/weight thermically alkali-activated aluminosilicate
10–40 parts/weight dealuminated phyllosilicate
30–80 parts/weight basic calcium silicate/calcium aluminosilicate glass
5–35 parts/weight potassium hydroxide Formulation 5

100 parts/weight dehydroxilated phyllosilicate (e.g. Metakaolin)
20–60 parts/weight potassium trisilicate
50–155 parts/weight thermically alkali-activated aluminosilicate
50–100 parts/weight basic calcium silicate/calcium aluminosilicate glass
2–25 parts/weight potassium hydroxide The hydraulic consolidation and product of tectoaluminosilicate cement are fundamentally different from the hardening mechanism and product of inorganic bonding agents based on Alite ($C_3S$), Belite ($C_2S$), pozzolan, tricalcium-aluminate, etc. With traditional inorganic cements, the hardening takes place essentially through the hydration of mineral components. The hydration of tricalcium-aluminate (with gypsum-free Portland cement) and the subsequent formation of Ettringite (with ordinary Portland cement) is responsible for quick setting and the hydration of silicate mineral components for the later and long-term hardness.

The hydration of $C_3S$ takes place with the formation of calcium silicate-hydrate gel and/or needle-shaped calcium silicate-hydrate crystals (Tobermorite) and the release of calcium hydroxide.

The calcium silicate-hydrate gels and crystals responsible for strength are strip and sheet silicates, as may be demonstrated by a series of investigations with $^{29}Si$-, $^{27}Al$-MAS-NMR [G. Englehardt, D. Michel, "High-Resolution Solid-State NMR of Silicates and Zeolites", John Wiley, (1987)].

On the other hand, the hydraulic hardening of the tectoaluminosilicate cement corresponds to a condensation reaction, giving rise to a 3-dimensional silicate framework structure in which Si atoms are partially replaced by Al atoms.

The basic framework is provided by the dehydroxilated phyllosilicate. The dehydration and dehydroxilation of phyllosilicates in the temperature range 500° C. to 850° C. leads to a thermic activation of the aluminium silicate structure. The dehydration and dehydroxilation (14% weight loss with kaolin) generally takes place without (or with only an insignificant) contraction in volume. However, this is combined with an increase in the specific internal surface area by a factor of up to 5).

Dehydroxilation destroys the originally ordered sheet structure of the silicate and aluminate layers. Whereas the sheet structure of $Si_2O_5$ remains largely intact, the octahedral structure of $Al(OH)_3$ collapses completely. To some extent, there is a formation of covalent Si-O-Al bonds. The product is to some extent X-ray amorphous. $^{27}Al$-MAS-NMR spectrographs show resonances corresponding to tetrahedrally coordinated Al (50–65 ppm as against $[Al(H_2O)_6]^{3+}$) and a broad resonance at 25–35 ppm, which is assigned by several authors to 5-coordinated $Al^{3+}$.

A range of dehydroxilated phyllosilicates shows a so-called superstructure, i.e. they indicate X-ray reflections corresponding to greater sheet intervals of from 10 to 27 Å.

As a result, dehydroxilated phyllosilicates dispose of an energy-rich and highly reactive structure. They are used in a whole range of processes as initial products for the synthesis of zeolites (which belong to the tectosilicate family). In general, the synthesis of zeolites requires temperatures of at least 80° C.

Thus, in particular, a new feature of the process in the invention is the formation of tectosilicates in the temperature range from room temperature to below freezing point. Under the catalytic effect of alkalis (LiOH, NaOH, KOH) and in the presence of dissolved $SiO_2$ (e.g. potassium silicate), the silicate framework is rearranged through a series of condensation reactions, with the formation of very small three-dimensionally interwoven tectosilicates. In the course of the condensation reactions, the alkalis are neutralized. $SiO_2$ and $Al_2O_3$ act formally as acids. The end-product is only slightly basic. $^{29}Si$ and $^{27}Al$-MAS-NMR spectrographs of the products obtained show only resonances corresponding to tetrahedrally coordinated Si and Al. The $^{29}Si$ resonance line at 94 ppm (against tetramethylsilan) can be assigned to tetrahedrally coordinated Si with 2–3 Al atoms (Si(3Al) 88–94 ppm, Si(2Al) 95–105 ppm) in the second coordination sphere. The maximum resonance at 114 ppm corresponds to tetrahedrally coordinated Si without Al atoms in the closer coordination sphere. The $_2^7Al$ resonance line at 53 ppm (against $[Al(H_2O)_6]^{3+}$) corresponds unambiguously to tetrahedrally coordinated Al, as found in feldspars and zeolites.

The relatively narrow resonance line in $^{27}Al$-MAS-NMR and the appearance of 2 clearly separated resonances in $^{29}Si$-MAS-NMR confirm the microcrystallinity (needles and prisms) observed with the electron scanning microscope and optical microscope. This cannot be reconciled with the broad unstructured resonances observed with aluminosilicate glasses. However, it is not possible to state the type and/or to assign it to a specific group of tectosilicates, the bonding matrix being X-ray amorphous, i.e. the crystallites are smaller than 10 $\mu m$.

In contrast, the $^{29}Si$-MAS-NMR spectrographs of hydrated Portland cement clearly correspond to chain and strip silicates ($^{29}Si$, 77 ppm) and the $^{27}Al$-MAS-NMR resonances to octahedrally coordinated Al (3 ppm), as is found in calcium aluminate hydrates.

The difference from bonding agents based on Portland cement (calcium silicate hydrate systems) is even more clearly expressed in thermographimetric (TG) and differential thermographimetric (DTG) images of the condensation product of tectoaluminosilicate cement. In the differential thermogram, there is a maximum at around 250° C. and a shoulder running up to 1000° C., corresponding to the release of structurally compounded water.

On the other hand, the DTG of hydrated Portland cement indicates a range of discrete maxima (100° C., 180° C., 320° C., 450° C.).

The third reactive component of the tectoaluminosilicate cement, the slightly basic calcium silica glass (e.g. basic blast furnace slag) serves mainly as an accelerator and/or activator. The dehydroxilated phyllosilicate ($2SiO_2 \cdot Al_2O_3$)), from its very nature, reacts most rapidly with the soluble alkali silicates. However, the rapidity of setting and the development of strength in the early stage of the hardening process is determined by the calcium ions. In the absence of calcium ions, calcium silicate and/or calcium aluminiumsilicate, a thixotropic aluminosilicate gel forms in the first stage of the reaction. In the presence of calcium ions, calcium silicates and/or calcium aluminium silicates, a rapid gelling process takes place, the bonding matrix solidifying with the formation of calcium alkali aluminosilicates.

Thus, in particular, the process in the invention is new because of the possibility of using an appropriate choice of components and/or mix ratios to regulate the setting time in a range of from 15 minutes to 8 hours, the initial strength 4 hours after setting from 6 to 20 MPa and the attainment of final strength in a range of from 3 days to more than a year.

The chemical resistance of the bonding matrix is a function of the Si/Al ratio and can be adjusted by metering of the reactive silica components. However, the Si/Al ratio must be greater than 1.5 in order to ensure the formation of the tectosilicate phases in accordance with the invention.

Examples of the invention will be given below together with examples for comparison with reference to the drawings. These are:

BRIEF DESCRIPTION OF DRAWINGS

FIG. 1: a diagram of the temperature resistance of tectoaluminosilicate ISO prisms FIG. 2: a diagram of strength development at 20° C. and 60% relative humidity FIG. 3: a diagram of durability tests in various media FIG. 4: a diagram of the form resistance and alkali aggregate reaction of the tectoaluminosilicate bonding matrix in comparison with ordinary Portland cement

EXAMPLE 1

Figure 5:
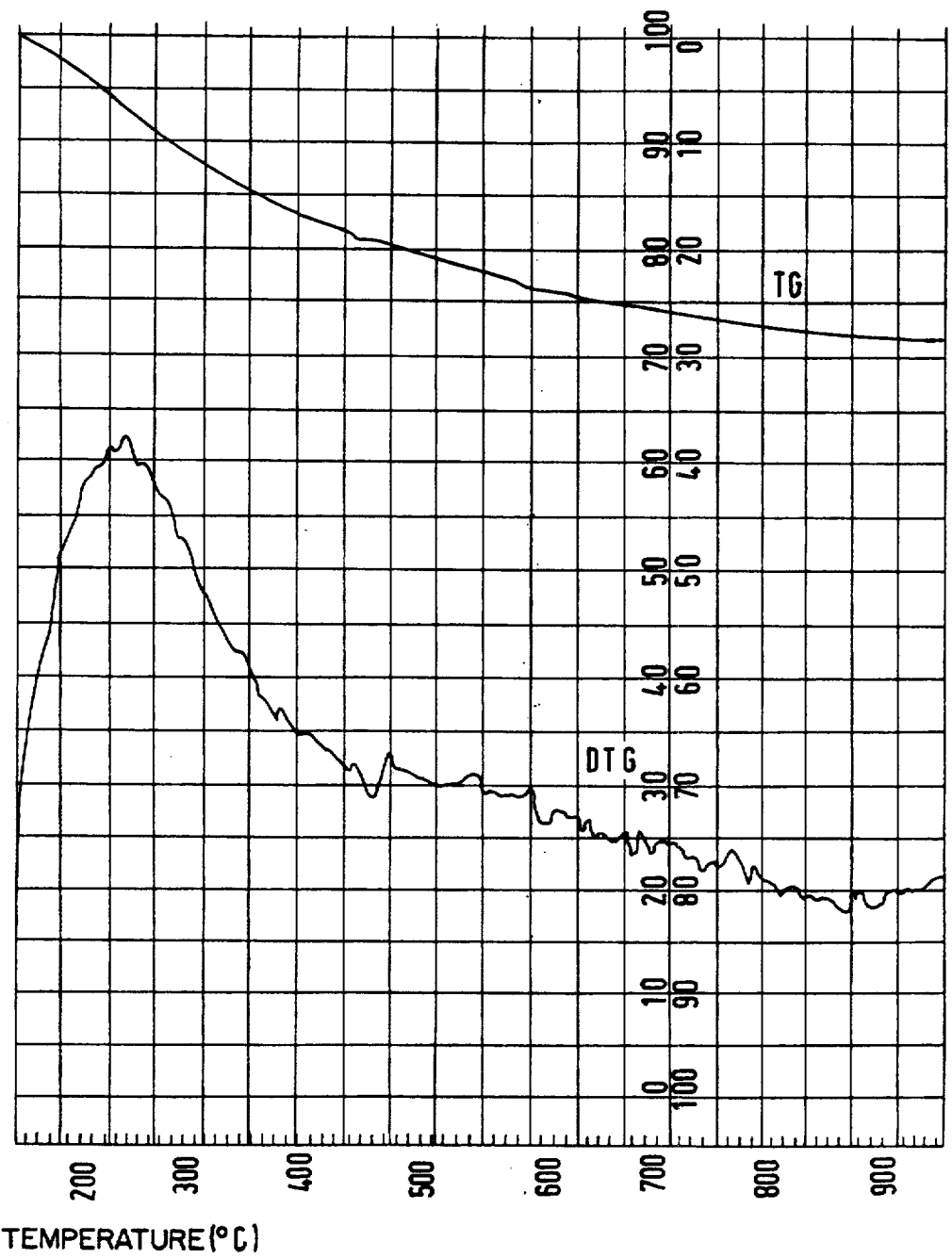
FIG. 5: a thermographimetric and a differential thermographimetric diagram of the tectoaluminosilicate bonding matrix

Thermically alkali-activated aluminosilicate was manufactured in the following way.

100 parts by weight blast furnace fly ash and 100 parts by weight sodium carbonate were mixed together and sintered for one hour at 900° C. The sintered, partly molten product was cooled to under 100° C. within 2 minutes and ground to a grain size of <15 μm.

The fly ash had the following composition:

| $SiO_2$ | 52.55% weight |
|---|---|
| $Al_2O_3$ | 28.26% weight |
| $Fe_2O_3$ | 6.37% weight |
| CaO | 3.14% weight |
| MgO | 1.58% weight |
| $Na_2O$ | 0.36% weight |
| $K_2O$ | 3.84% weight |
| Remainder | to 100% |

The calcinated fly ash had the following composition:

| $SiO_2$ | 31.42% weight |
|---|---|
| $Al_2O_3$ | 16.73% weight |
| $Fe_2O_3$ | 4.06% weight |
| CaO | 2.73% weight |
| MgO | 0.97% weight |
| $Na_2O$ | 36.48% weight |
| $K_2O$ | 2.38% weight |
| Remainder | to 100% |

The product is highly porous with an average grain size of 1-2 μm. It contains 10% by weight of parts which are soluble in distilled water (sodium silicate, sodium aluminate).

Characterization by X-ray diffraction showed, in addition to a majority of amorphous components, the feldspathoid sodium aluminosilicate, Carnegieite $Na[AlSiO_4]$.

EXAMPLE 2

| 65 parts/weight | metakaolin |
|---|---|
| 40 parts/weight | thermically alkali-activated aluminosilicate from Example 1 |
| 25 parts/weight | dipotassium silicate |
| 50 parts/weight | blast furnace slag |
| 10 parts/weight | potassium hydroxide |

The components were homogenized for 30 seconds in a mixing drum (Hobart Canada Inc, Model N-50), mixed for 270 seconds with 55 parts water and subsequently mixed for 60 sec with 450 parts standard sand (Iso-sand, DIN 1164/Part 7). The mass was then poured into standard forms (DIN 1164/Part 7). After 4 hours (i.e. 2 hours after hardening), there was a compressive strength of 7 MPa, after 24 hours a compressive strength of 35 MPa and after 3 days a compressive strength of 65 MPa.

The following raw materials were used:

|  | Metakaolin % | Silica fume % | Slag % | KS3 % | KOH % |
|---|---|---|---|---|---|
| $SiO_2$ | 54 | 94 | — | 39 | 66 |
| $Al_2O_3$ | 42 | — | 8 | — | — |
| $K_2O$ | 2 | — | 0 | 34 | 84 |
| CaO | — | — | 40 | — | — |
| MgO | — | — | 11 | — | — |

EXAMPLE 3

| 32 parts/weight | metakaolin |
|---|---|
| 100 parts/weight | thermically alkali-activated aluminosilicate from Example 1 |
| 10 parts/weight | microsilica |
| 16 parts/weight | dipotassium silicate |
| 25 parts/weight | blast furnace slag |
| 10 parts/weight | potassium hydroxide | were mixed with 45 parts water as in example 2. The mass hardened after one hour. After 24 hours, the compressive strength measured was 14 MPa and, after 4 days, the compressive strength was 49 MPa.

EXAMPLE 4

A dehydroxilated phyllosilicate was manufactured through calcination of a clay mineral in the following way.

An arenaceous clay, consisting of quartz and the clay minerals illite and kaolinite, was calcinated at 750° C. and then ground to an average grain size of 3.5 μm.

| Chemical composition prior to calcination | |
|---|---|
| Heat loss | 4.89% weight |
| SiO$_2$ | 79.57% weight |
| Al$_2$O$_3$ | 12.71% weight |
| Fe$_2$O$_3$ | 0.77% weight |
| CaO | traces |
| MgO | 0.24% weight |
| Na$_2$O | 0.08% weight |
| K$_2$O | 0.68% weight |
| Remainder | to 100% |

EXAMPLE 5

| | |
|---|---|
| 300 parts/weight | calcinated clay from example 4 |
| 80 parts/weight | dipotassium silicate |
| 210 parts/weight | blast furnace slag |
| 30 parts/weight | potassium hydroxide | were mixed with 148 parts water as in example 2. The mass hardened after 1.5 hours. After 4 hours (i.e. 2.5 hours after hardening), there was a compressive strength of 8 MPa, after 24 hours (i.e. 22.5 hours after hardening), a compressive strength of 32 MPa and, after 28 days, a compressive strength of 68 MPa.

EXAMPLE 6

| | |
|---|---|
| 100 parts/weight | metakaolin from example 2 |
| 190 parts/weight | calcinated clay from example 4 |
| 80 parts/weight | dipotassium silicate |
| 180 parts/weight | blast furnace slag |
| 20 parts/weight | potassium hydroxide | were mixed with 138 parts water as in example 2. The mass hardened after 70 minutes. After 4 hours (i.e. 3 hours after hardening), there was a compressive strength of 15 MPa, after 24 hours (i.e. 22.5 hours after hardening), a compressive strength of 29 MPa and, after 28 days, a compressive strength of 78 MPa.

EXAMPLE 7

100 parts smectite (consisting of montmorillonite, vermiculite, illite, traces of chlorite and kaolinite, quartz, tridymite) were stirred in 500 ml of 10% sulphuric acid at 60° C. for half an hour, the residue being filtered, washed and dried at 110° C. The chemical analysis indicated an SiO$_2$ content of 95%, the remainder being water. The grain size of the material was between 0.01 and 1 μm.

EXAMPLE 8

| | |
|---|---|
| 100 parts/weight | metakaolin from example 2 |
| 140 parts/weight | calcinated clay from example 4 |
| 50 parts/weight | dealuminated phyllosilicate from example 7 |
| 70 parts/weight | dipotassium silicate |
| 180 parts/weight | blast furnace slag |
| 30 parts/weight | potassium hydroxide | were mixed with 162 parts water as in example 2. The mass hardened after 50 minutes. After 4 hours (i.e. 3 hours after hardening), there was a compressive strength of 19 MPa, after 24 hours (i.e. 22.5 hours after hardening), a compressive strength of 32 MPa and, after 28 days, a compressive strength of 95 MPa.

EXAMPLE 9

| | |
|---|---|
| 150 parts/weight | metakaolin from example 2 |
| 190 parts/weight | calcinated clay from example 4 |
| 60 parts/weight | dealuminated phyllosilicate from example 7 |
| 180 parts/weight | blast furnace slag |
| 52 parts/weight | potassium hydroxide | were mixed with 180 parts water as in example 2. The mass hardened after 30 minutes. After 4 hours (i.e. 3.5 hours after hardening), there was a compressive strength of 11 MPa, after 24 hours (i.e. 23.5 hours after hardening), a compressive strength of 35 MPa and, after 28 days, a compressive strength of 89 MPa.

EXAMPLE 10

| | |
|---|---|
| 135 parts/weight | metakaolin from example 2 |
| 60 parts/weight | dipotassium silicate |
| 80 parts/weight | silica fune |
| 105 parts/weight | blast furnace slag |
| 22 parts/weight | potassium hydroxide | were mixed with 100 parts water as in example 2. The mass hardened after 15 minutes. After 4 hours, there was a compressive strength of 13 MPa, after 24 hours, a compressive strength of 34 MPa, after 2 days a compressive strength of 55 MPa and, after 28 days, a compressive strength of 89 MPa.

EXAMPLE 11

The mortar prism from example 10, was checked again 4 hours after the compressive strength test: a compressive strength of 6 MPa was measured.

EXAMPLE 12

Test for temperature resistance:
Mortar prisms from example 10 were left in a muffle furnace for 1 hour at temperatures of 550° C., 700° C., 850° C. and 1000° C. It can be seen from FIG. 1 that the samples showed no measureable change in volume up to 550° C., a weight loss of 3% and a loss of compressive strength of 20%. The observed reduction in strength above 550° C. is brought about by the phase change of the aggregate (quartz) at 570° C. From 850° C., strength again increases. Up to 1000° C., no sintering was observed.

The bonding matrix itself remains solid up to 800° C. but above 800° C., surface cracking appears. The core material increases its mechanical strength.

EXAMPLE 13

Determination of porosity on the basis of air entrainment: less than 4% of volume.

EXAMPLE 14

Durability tests: The mortar prisms were manufactured in the way described in example 2 and tested by the following methods:

(i) Mechanical resistance to air (FIG. 2): The prisms were stored at 60% relative humidity and 20° C. FIG. 2 shows that the compressive strength and the tensile bend strength continued to increase for 2 months and subsequently remained more or less constant (period of measurement-6 months).

(ii) For the tests below, the prisms, after 28 days storage at 60% relative humidity and 20° C., were dried at 105° C. to constant weight and brought into contact with the test medium.

Humid air: 95% relative humidity at 20° C.

Still water: total immersion of the prisms in water at 20° C.

Flowing water: the prisms are half-immersed in flowing water (10 l/h, 20° C.). "Downstream" designates the part under water.

Sulphate resistance: total immersion in 10% $K_2SO_4$ solution at 20° C.

Frost-Defrost cycles: 8 hours total immersion of the prisms in water at 20° C., then 16 hours freezing at $-20°$ C. Duration of cycle: 1 day.

Immersion-Drying cycles: 8 hours total immersion of the prisms in water at 20° C., then 16 hours drying at 105° C. Duration of cycle: 1 day.

Frequency of measurement: 28 days, 90 days, 180 days, 360 days. Measurements were taken of compressive strength, chemical composition, soluble salts and water absorption. Apart from potassium, the chemical composition remained the same. In all tests, even after 180 days, the loss of $K_2O$ was less than 3% in relation to the initial value. The absorption of water (water absorption in accordance with Belgian norm NBN B15-215, 1/1989) was, in all tests, less than 3%.

From FIG. 3, it can be seen that no significant reduction in compressive strength was observed during the measurement period of 6 months in the above-mentioned media.

(iii) Form strength test and alkali-aggregate reaction. The test was carried out in accordance with ASTM C227, amended by VDZ. FIG. 4 shows that the tectoaluminosilicate bonding matrix had shrunk by only 0.05 mm per meter after 8 months. Despite the high alkali content of the tectoaluminosilicate cement, no alkali-aggregate reaction was observed. For comparison, an investigation was made into the behaviour of ordinary Portland cement (PC) in the presence of alkalis with alkali reactive and alkali non-reactive aggregates. A very clear increase in volume can be seen in the case of the Portland cement.

EXAMPLE 15

Figure 6:
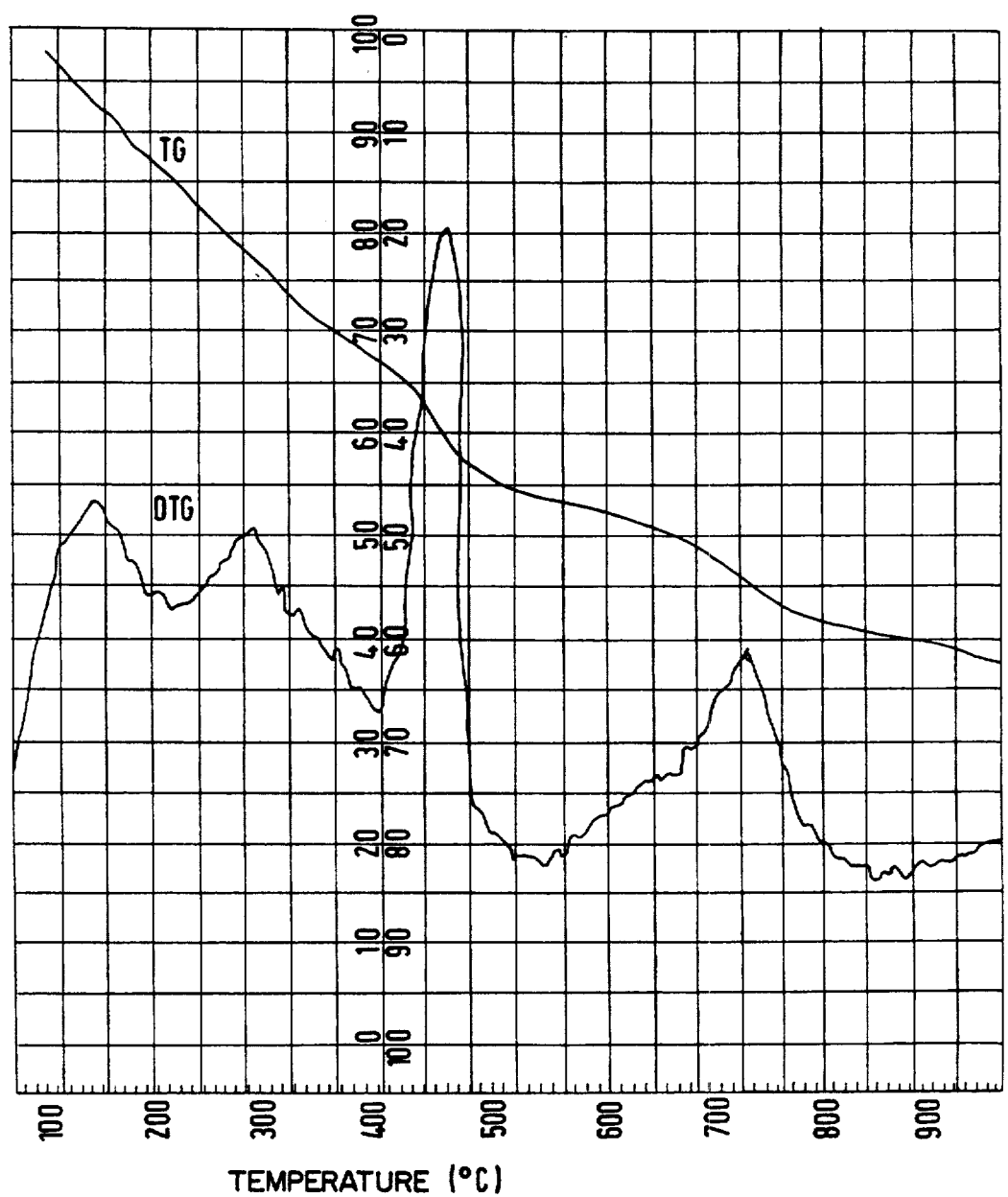
FIG. 6: a thermographimetric and a differential thermographimetric diagram for ordinary Portland cement

FIG. 5 shows a thermographimetric diagram (TG-above) and a differential thermographimetric diagram (DTG-below) of the bonding matrix. By way of comparison, FIG. 6 shows corresponding diagrams for a cement made from ordinary Portland cement.

EXAMPLE 16

Figure 7A:
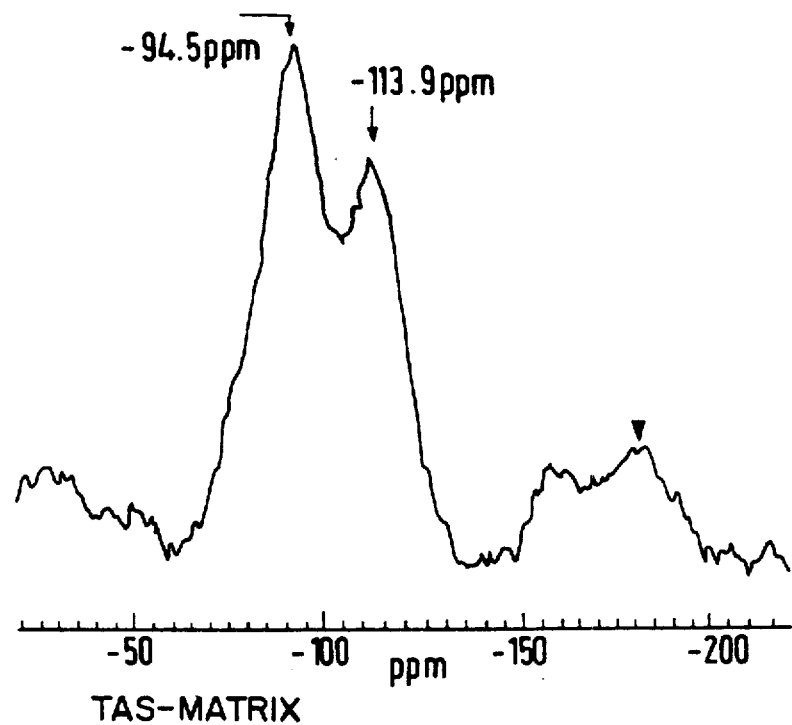
FIGS. 7A and 7B: a $^{29}$Si-MAS-NMR spectrograph of the tectoaluminosilicate bonding matrix and of an ordinary Portland cement (P50), respectively
Figure 7B:
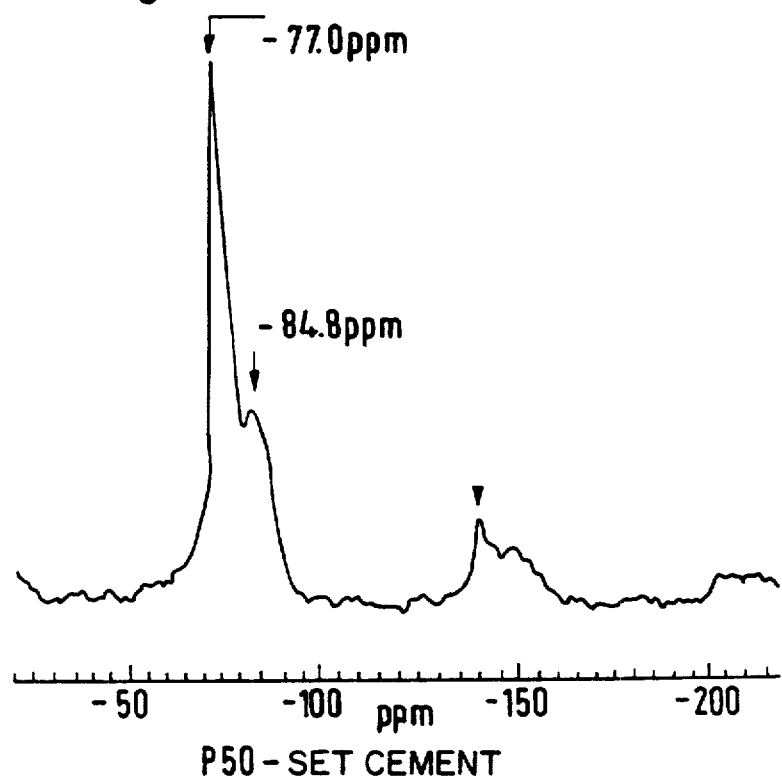
Figure 8A:
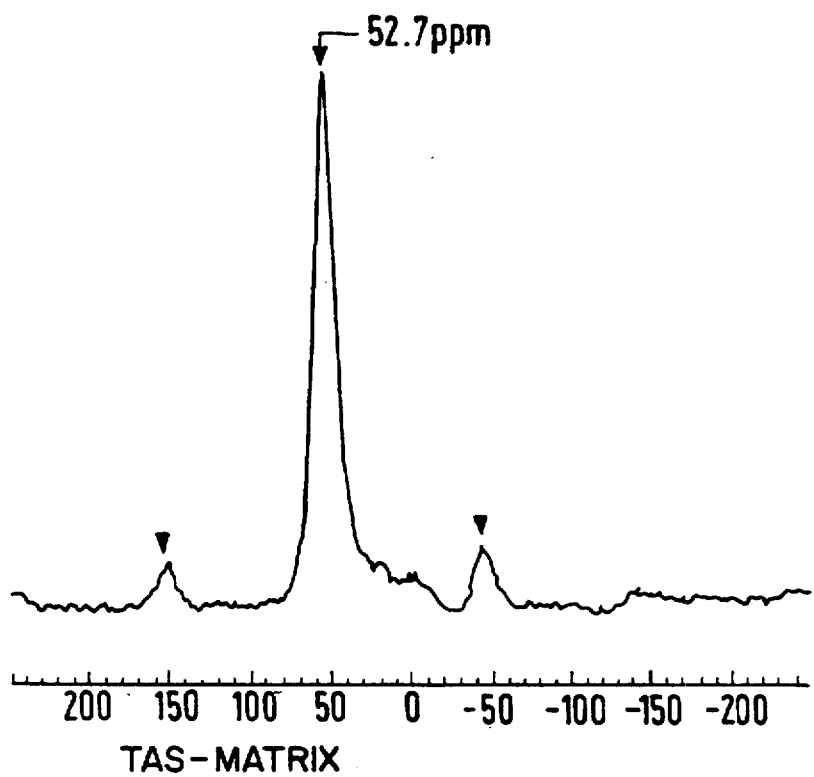
FIGS. 8A and 8B: a $^{27}$Al-MAS-NMR spectrograph of the tectoaluminosilicate bonding matrix and of an ordinary Portland cement (P50), respectively
Figure 8B:
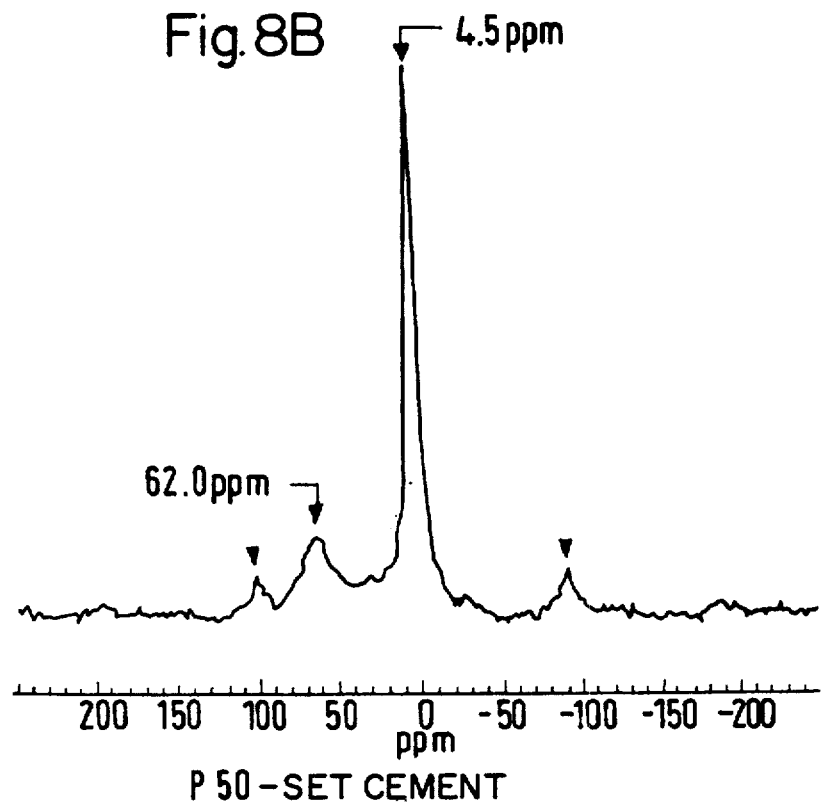

FIGS. 7A and 7B show $^{29}$Si-MAS-NMR recordings and FIGS. 8A and 8B $^{27}$Al-MAS-NMR recordings of the tectoaluminosilicate bonding matrix, FIGS. 7A and 8A, and of a cement made from ordinary Portland cement (P50) FIGS. 7B and 8B, respectively. The relevant explanations of the NMR measurements are given in the preceding description.

We claim:

1. A tectoaluminosilicate cement, consisting essentially of
   80 to 140 parts by weight at temperatures between 500° C. and 900° C., dehydroxylated phyllosilicate
   40 to 500 parts by weight reactive amorphous silica
   20 to 120 parts by weight reactive calcium silicate glass or reactive calcium aluminosilicate glass with a Ca:Si ratio $\geq 1$
   5 to 60 parts by weight alkali silicate with the molecular formula (I):

$$a(M_2O) * x(SiO_2) * y(H_2O) \tag{I}$$

with M=Li, Na, K and a=0–4, x=0–5 and y=3–20 in which the total Si:Al ratio is $\geq 1$.

2. A tectoaluminosilicate cement as claimed in claim 1, which further contains 1 to 50 parts by weight alkali hydroxide.

3. A tectoaluminosilicate cement as claimed in claim 1, in which the total Si:Al ratio is $\geq 1.5$.

4. A tectoaluminosilicate cement as claimed in claim 1, in which the dehydroxylated phyllosilicate is a metakaolin.

5. A tectoaluminosilicate cement as claimed in claim 1, in which the reactive amorphous silica is dealuminated phyllosilicate, a fly ash dealuminated with mineral acids, where applicable, a fine-grained crystalline form of $SiO_2$ contained in calcinated clays, a silicic acid gel, a thermically alkali-activated aluminosilicate obtained by sintering an aluminosilicate with alkali metal carbonate at temperatures between 800° C. and 1200° C., the alkali metal carbonate and aluminosilicate components being mixed in a ratio of from 1:6 to 1:1, and/or microsilica.

6. A tectoaluminosilicate cement as claimed in claim 1, in which an alkali activator arises in situ from dealuminated phyllosilicate and/or dealuminated fly ash and/or fine crystalline $SiO_2$ forms in the presence of one of the group of lithium hydroxide, sodium hydroxide and potassium hydroxide.

7. A bonding matrix derived from the tectoaluminosilicate cement, as claimed in claim 1, in a reaction of tectoaluminosilicate cement with $H_2O$ in a ratio of from 3:1 to 6:1, consisting essentially of the molecular formula:

$$(Li,Na)_{0-7}K_{1-6}Mg_{1-0}Ca_{3-0}[Al_4Si_{6-14}O_{21-36}]\cdot(0-15-H_2O) \tag{II}$$

8. A bonding matrix, as claimed in claim 7, in which it is thermically resistant up to temperatures of $\geq 1000°$ C.

9. A bonding matrix, as claimed in claim 7, in which it has a porosity of $\leq 4\%$ volume.

10. A bonding matrix, as claimed in claim 7, in which differential thermal analysis indicates a maximum at around 250° C. and a shoulder running up to 1000° C.

11. A concrete with a bonding matrix as claimed in claim 7 and standard aggregates in a bonding matrix to standard aggregate ratio of from 1:2 to 1:3 as well as a bonding agent/water ratio of from 5:1 to 3.3:1, in which it sets in within 15 minutes to 8 hours
   shows a compressive strength of from around 6 to around 20 MPa after 4 hours at 20° C.
   shows a compressive strength of from around 14 to around 40 MPa after 24 hours at 20° C.
   shows a compressive strength of from around 49 to around 65 MPa after 4 days at 20° C., and
   shows a compressive strength of from around 60 to around 90 MPa after 28 days at 20° C.

12. A concrete, as claimed in claim 11, in which by altering the mix ratios, the attainment of final strength can be regulated within a range of from 3 days to more than 1 year.

13. A tectoaluminosilicate cement as claimed in claim 1, consisting essentially of:
   100 parts by weight dehydroxylated phyllosilicate
   30–50 parts by weight potassium trisilicate
   50–75 parts by weight amorphous silica
   50–80 parts by weight basic calcium silicate or calcium aluminosilicate glass
   5–25 parts by weight potassium hydroxide.

14. A tectoaluminosilicate cement as claimed in claim 1, consisting essentially of:
   100 parts by weight dehydroxylated phyllosilicate
   10–30 parts by weight potassium trisilicate
   50–75 parts by weight dealuminated phyllosilicate
   50–80 parts by weight basic calcium silicate or calcium aluminosilicate glass
   5–25 parts by weight potassium hydroxide.

15. A tectoaluminosilicate cement as claimed in claim 1, consisting essentially of:
   100 parts by weight dehydroxylated phyllosilicate
   15–50 parts by weight potassium trisilicate
   100–400 parts by weight thermally alkali-activated aluminosilicate
   10–40 parts by weight of other amorphous silica
   30–80 parts by weight basic calcium silicate or calcium aluminosilicate glass
   5–35 parts by weight potassium hydroxide.

16. A tectoaluminosilicate cement as claimed in claim 1, consisting essentially of:
   100 parts by weight dehydroxylated phyllosilicate
   15–50 parts by weight potassium trisilicate
   100–400 parts by weight thermally alkali-activated aluminosilicate
   10–40 parts by weight dealuminated phyllosilicate
   30–80 parts by weight basic calcium silicate or calcium aluminosilicate glass
   5–35 parts by weight potassium hydroxide.

17. A tectoaluminosilicate cement as claimed in claim 1, consisting essentially of:
   100 parts by weight dehydroxylated phyllosilicate
   20–60 parts by weight potassium trisilicate
   50–155 parts by weight thermally alkali-activated aluminosilicate
   50–100 parts by weight basic calcium silicate or calcium aluminosilicate glass
   5–25 parts by weight potassium hydroxide.

18. A tectoaluminosilicate cement consisting essentially of at least one of the following components:
   100 parts by weight metakaolin or
   0–300 parts by weight calcinated arenaceous clay
and including the following components:
   0–59 parts by weight silica fume
   0–313 parts by weight thermally alkali-activated aluminosilicate
   0–40 parts by weight dealuminated phyllosilicate
   0–80 parts by weight dipotassium silicate
   77–210 parts by weight blast furnace slag
   15–35 parts by weight potassium hydroxide.

* * * * *